United States Patent
Carabin et al.

(10) Patent No.: US 9,121,605 B2
(45) Date of Patent: Sep. 1, 2015

(54) THREE STEP ULTRA-COMPACT PLASMA SYSTEM FOR THE HIGH TEMPERATURE TREATMENT OF WASTE ONBOARD SHIPS

(75) Inventors: Pierre Carabin, Quebec (CA); Michel G. Drouet, Quebec (CA)

(73) Assignee: PYROGENESIS CANADA, INC., Montreal (CA)

( * ) Notice: Subject to any disclaimer, the term of this patent is extended or adjusted under 35 U.S.C. 154(b) by 1961 days.

(21) Appl. No.: 11/993,405

(22) PCT Filed: Jun. 21, 2006

(86) PCT No.: PCT/CA2006/001031
§ 371 (c)(1),
(2), (4) Date: Aug. 12, 2010

(87) PCT Pub. No.: WO2006/136023
PCT Pub. Date: Dec. 28, 2006

(65) Prior Publication Data
US 2010/0313797 A1    Dec. 16, 2010

Related U.S. Application Data

(60) Provisional application No. 60/692,266, filed on Jun. 21, 2005.

(51) Int. Cl.
*F23G 5/00* (2006.01)
*B09B 3/00* (2006.01)
*F23G 5/44* (2006.01)
(Continued)

(52) U.S. Cl.
CPC .............. *F23G 5/448* (2013.01); *B09B 3/0025* (2013.01); *B09B 3/0083* (2013.01); *F23G 5/033* (2013.01);
(Continued)

(58) Field of Classification Search
CPC ........... F23G 5/033; F23G 5/085; F23G 5/10; F23G 2201/80; F23G 2204/201; F23G 2205/18; F23G 2203/70; F23G 5/448; F23M 5/08; F23M 2900/05004; F23M 2900/05001; B09B 3/0025; B09B 3/0083
USPC ......... 110/235, 247, 250, 255, 346, 194, 226, 110/295, 207, 210, 214; 266/275, 242
See application file for complete search history.

(56) References Cited

U.S. PATENT DOCUMENTS 1,330,227 A *  2/1920  Amdursky .................... 110/176
2,049,025 A *  7/1936  Rosebrook ................. 137/234.6
(Continued)

FOREIGN PATENT DOCUMENTS

CH         685377       12/2007
JP      2000053975       2/2000

OTHER PUBLICATIONS

"Crucible." The Columbia Encyclopedia. New York: Columbia University Press, 2013. <http://search.credoreference.com/content/entry/columency/crucible/0>. Accessed May 12, 2014.*

*Primary Examiner* — Kenneth Rinehart
*Assistant Examiner* — Tavia Sullens
(74) *Attorney, Agent, or Firm* — Novak Druce Connolly Bove + Quigg LLP

(57) ABSTRACT

An apparatus for thermal processing of waste having organic and inorganic components comprises at least a treatment station, a cooling station and a treated material-removal station, and at least three crucibles. The treatment station is adapted to thermally treat the organic components and/or inorganic components located in a given one of the crucibles located at the treatment station. The so-treated components in this given crucible are adapted to then be cooled at the cooling station, before the treated components located in the given crucible are removed therefrom at the treated material-removal station. The three crucibles are mounted on a turntable so that the three crucibles are each at one of the stations, before synchronously all moving to each crucible's next station.

37 Claims, 9 Drawing Sheets

(51) Int. Cl.
  *F23G 5/033*  (2006.01)
  *F23G 5/08*   (2006.01)
  *F23G 5/10*   (2006.01)
  *F23M 5/08*   (2006.01)

(52) U.S. Cl.
  CPC  *F23G 5/085* (2013.01); *F23G 5/10* (2013.01); *F23M 5/08* (2013.01); *F23G 2201/80* (2013.01); *F23G 2203/70* (2013.01); *F23G 2204/201* (2013.01); *F23G 2205/18* (2013.01); *F23G 2209/20* (2013.01); *F23M 2900/05001* (2013.01); *F23M 2900/05004* (2013.01)

(56) References Cited

U.S. PATENT DOCUMENTS

| | | | | |
|---|---|---|---|---|
| 2,665,223 | A * | 1/1954 | Clough et al. | 432/264 |
| 3,035,528 | A * | 5/1962 | Bolton | 73/65.06 |
| 3,341,187 | A * | 9/1967 | Luna | 266/240 |
| 3,464,892 | A * | 9/1969 | Bennett | 202/98 |
| 3,807,324 | A * | 4/1974 | Williamitis | 110/250 |
| 4,725,227 | A * | 2/1988 | Hailey | 432/239 |
| 4,949,653 | A * | 8/1990 | Rast | 110/346 |
| 5,100,638 | A * | 3/1992 | Levin | 110/346 |
| 5,495,812 | A * | 3/1996 | Schulze | 110/237 |
| 5,602,298 | A * | 2/1997 | Levin | 110/346 |
| 5,606,925 | A | 3/1997 | Boen et al. | |
| 5,958,264 | A * | 9/1999 | Tsantrizos et al. | 110/250 |
| 5,960,026 | A * | 9/1999 | Nolting et al. | 373/24 |
| 6,152,050 | A * | 11/2000 | Tsantrizos et al. | 110/250 |
| 6,514,469 | B1 * | 2/2003 | Kado et al. | 110/250 |
| 2003/0019849 | A1 * | 1/2003 | Cameron et al. | 219/121.27 |

\* cited by examiner

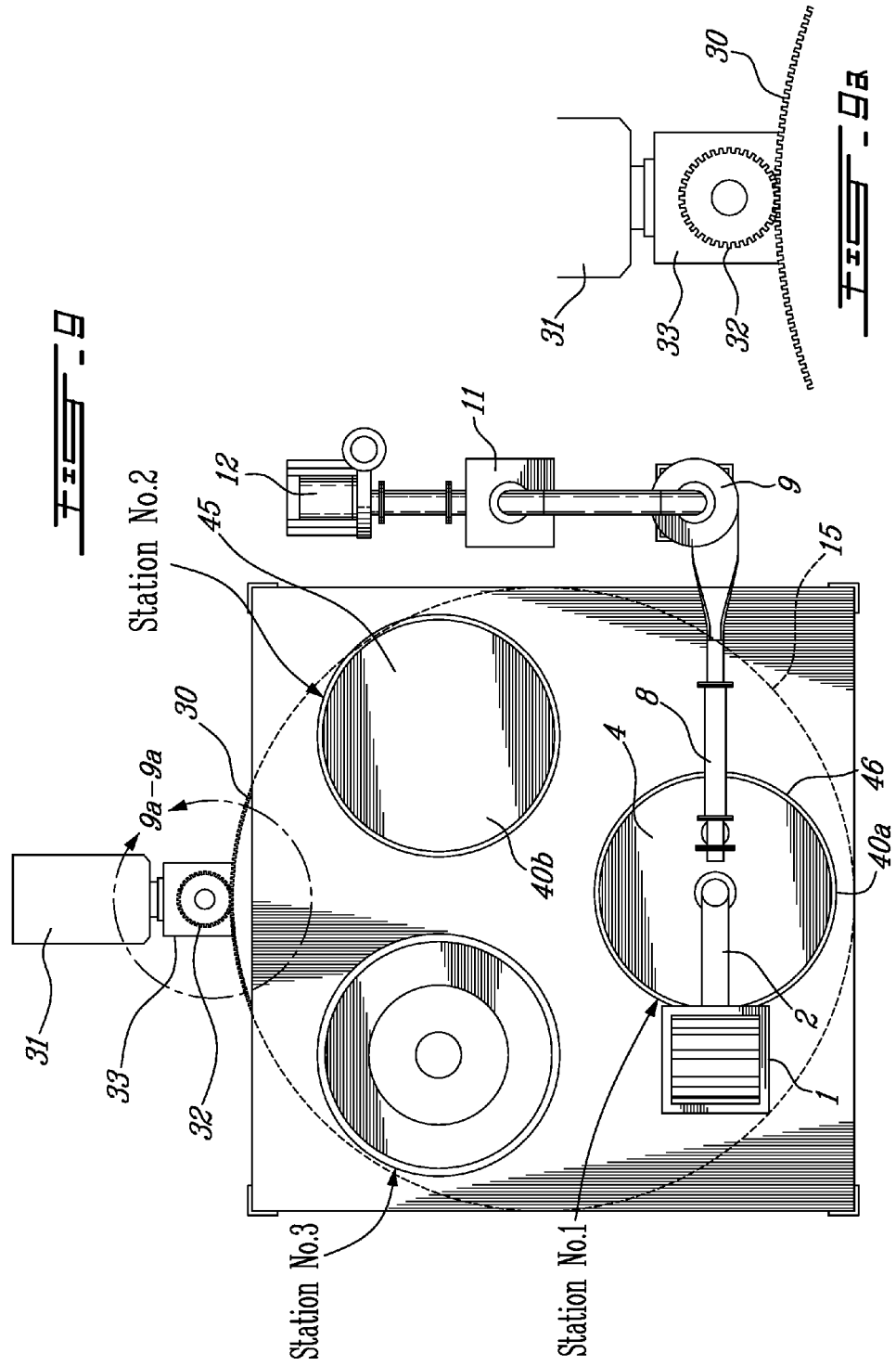

THREE STEP ULTRA-COMPACT PLASMA SYSTEM FOR THE HIGH TEMPERATURE TREATMENT OF WASTE ONBOARD SHIPS

CROSS REFERENCE TO RELATED APPLICATIONS

This application is a §371 National Phase of PCT/CA2006/001031, filed Jun. 21, 2006, which claims priority of U.S. Provisional Application No. 60/692,266, filed Jun. 21, 2005, the entirety of which are hereby incorporated by reference.

FIELD OF THE INVENTION

The present invention relates to systems for the treatment of waste and, more particularly, typically to such treatment effected onboard ships.

BACKGROUND OF THE INVENTION

The current practice, onboard Navy ships, is to use Golar-type incinerators to dispose of waste. These incinerators are refractory lined vessels into which un-shredded or shredded waste is fed through a feed port. Additional heat is typically supplemented by fuel oil burners. These incinerators typically do not have a secondary combustion chamber or any type of gas cleaning system. The off-gas is simply diluted and exhausted to a chimney through a fan. These incinerators typically have low temperature (around 600° C.). Consequently, several types of wastes (plastics, metal, glass, food, biomedical waste and sharps) cannot be processed in these incinerators, requiring segregation and the operation of several types of specialized equipment.

Plastic waste is processed in a plastic waste processor (PWP) that melts plastics at relatively low temperature into solid pucks. The PWPs are known to have a low processing rate and, since they are not equipped with a fume treatment system, they emit smelly fumes. The plastic pucks must be stored onboard possibly for long periods, since the navy ships can be at sea for several months. This takes up valuable space, as well as causing a nuisance to the sailors, as the plastics are often contaminated with food or other putrescible matter, releasing odours.

Food waste is typically processed in pulpers that break up food waste with large amounts of water into a fine pulp. This pulp can then be discharged to sea. However, the pulping of food requires sorting of the food, because any contaminants such as plastics are not allowed to be discharged into the sea.

Metal is separated and compressed using hydraulic presses. Glass is also separated and crushed in glass crushers. The operation of these additional pieces of equipment and the time required for segregation takes up valuable time from the sailors' routine, which would be better spent for other useful duties.

Biomedical waste can be treated in autoclaves that sterilize the waste. However, these autoclaves take up valuable shipboard space and require significant amounts of steam to operate.

Newer incinerators have been developed that operate at higher temperature and that include gas treatment systems. However, because they use oil burners, these incinerators tend to be large, typically requiring several decks of space.

Incinerators also present a number of safety problems. For example, the hot ashes that must be discharged could burn the operators. Sharps from biomedical waste stay in their original form and could cut and possibly contaminate the operators with dangerous pathogens, when being discharged with the ashes.

The present invention seeks to meet these needs and other needs.

SUMMARY OF THE INVENTION

It is therefore an aim of the present invention to provide a novel plasma system for the high-temperature treatment of waste, such as waste found onboard ships.

Therefore, in accordance with the present invention, there is provided an apparatus for thermal processing of waste having organic and inorganic components, comprising at least a treatment station, a cooling station and a treated material-removal station, at least three crucibles being provided, wherein said treatment station is adapted to thermally treat the organic components and/or inorganic components located in a given one of said crucibles located at said treatment station, treated components in said given crucible being adapted to then be cooled at said cooling station, before the treated components located in said given crucible are removed therefrom at said treated material-removal station.

Also in accordance with the present invention, there is provided a method of thermal waste treatment, comprising the steps of (a) providing three crucibles; (b) feeding organic and/or inorganic materials in a first one of said crucibles; (c) thermally processing the organic and/or inorganic materials in said first crucible; (d) allowing the organic and/or inorganic materials in said first crucible to cool; and (e) removing the cooled treated materials from said first crucible; wherein second and third crucibles are respectively undertaking steps (d) and (a) while said first crucible is at step (c), such that said crucibles are simultaneously in respective ones of steps (c) to (e) and move one after the other, and repeatedly, through the cycle of steps (c) to (e).

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 9 is a schematic top plan view of the system of FIG. 1, but also showing a driving mechanism for a turntable of the system; and FIG. 9a is an enlarged schematic view of bubble 9a in FIG. 9.

DESCRIPTION OF ILLUSTRATIVE EMBODIMENTS

Figure 1:
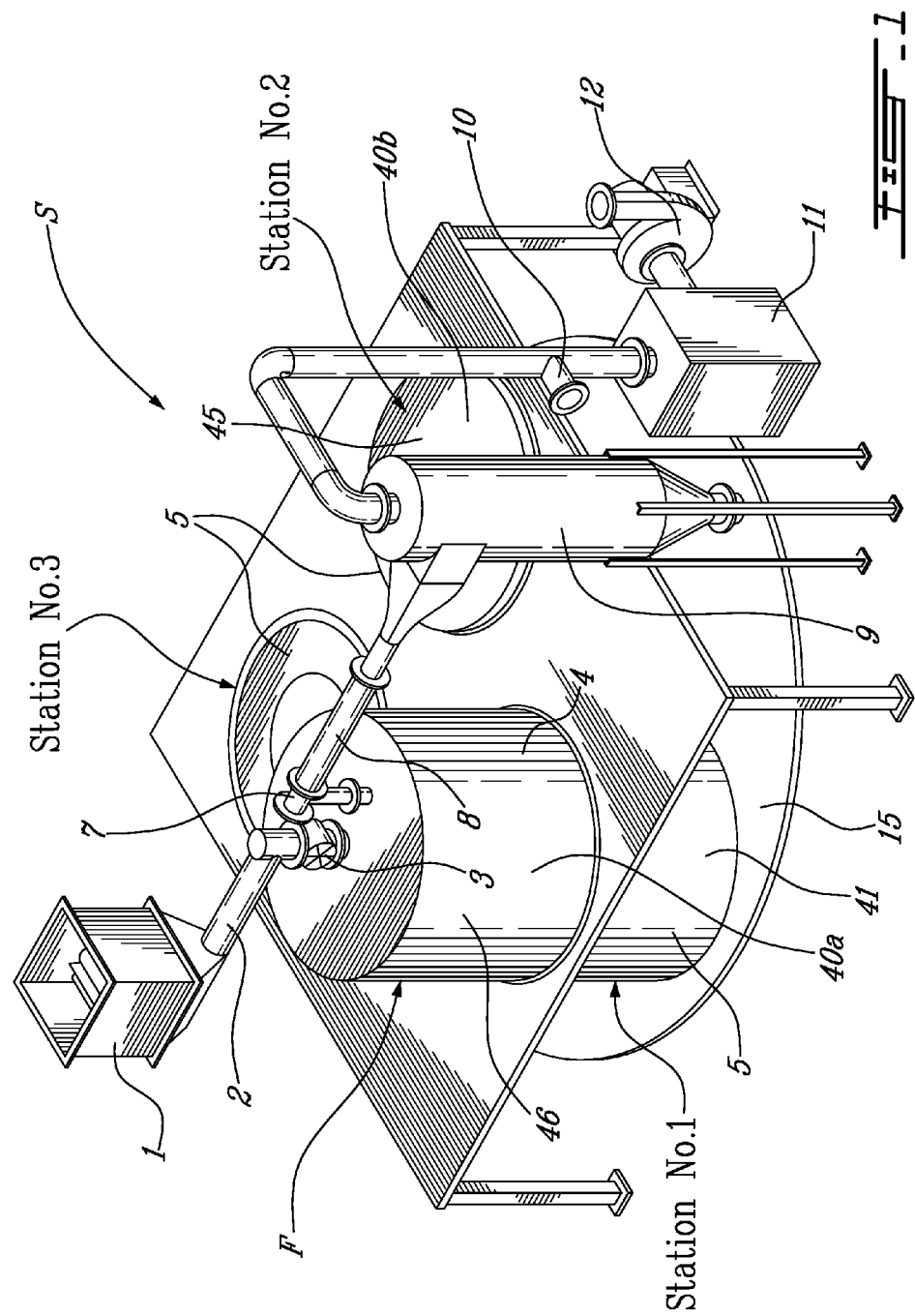
FIG. 1 is a schematic perspective view of a system in accordance with the present invention.

The present invention is illustrated in further details by the following non-limiting examples. More specifically, the present invention provides a compact system, capable of processing typically all types of waste without segregation or sorting (including plastics, food, metal, glass biomedical waste and sharps). In addition, the system is safe (no hot ashes or sharps to manipulate) and provides a highly efficient combustion (inert slag by-product that can be safely discharged to sea).

In the system S of the present invention, the furnace walls of the treatment furnace F are water-cooled for safety and to limit heating of the furnace room.

The treatment of the waste is conducted in a refractory lined crucible heated either at a temperature of 1500° C. by a plasma torch to obtain a melt of the non-organics in the case of Option 1, or in the case of Option 2, at a temperature of 850° C. by electrical heating elements imbedded in the crucible refractory if only gasification and sintering of the non-organics is required.

The crucible is a refractory lined cylindrical vessel (41). The crucible is designed with sufficient insulation backing (42) so as to keep most of the heat inside the treatment chamber and encourage minimal heat losses during treatment. In addition, the crucible has an external water jacket (43), through which cooling water is circulated. Sea water can be used for that purpose. In such a case, the crucible shell is fabricated with a sea water corrosion resistant material, such as titanium.

The material to be treated is conveyed via conveyor (2), after having gone through shredding station (1), such as to be fed to the furnace F through a rotary valve (3). The shredding station (1) is used to increase the surface area of the waste and to accelerate the chemical reactions in the treatment surface F. The shredding station (1) is also used to provide a substantially uniform feed rate of solids to the treatment furnace F and therefore a substantially constant rate of gas generation from the furnace. For the purpose of shredding, a powerful shear or rotary grinder-type shredder is used, so that all waste material typical to ships can be fed to the system without sorting. This includes combustible material such as paper, cardboard, plastics, rags, and also non-combustible material such as glass bottles and metal cans.

Figure 2:
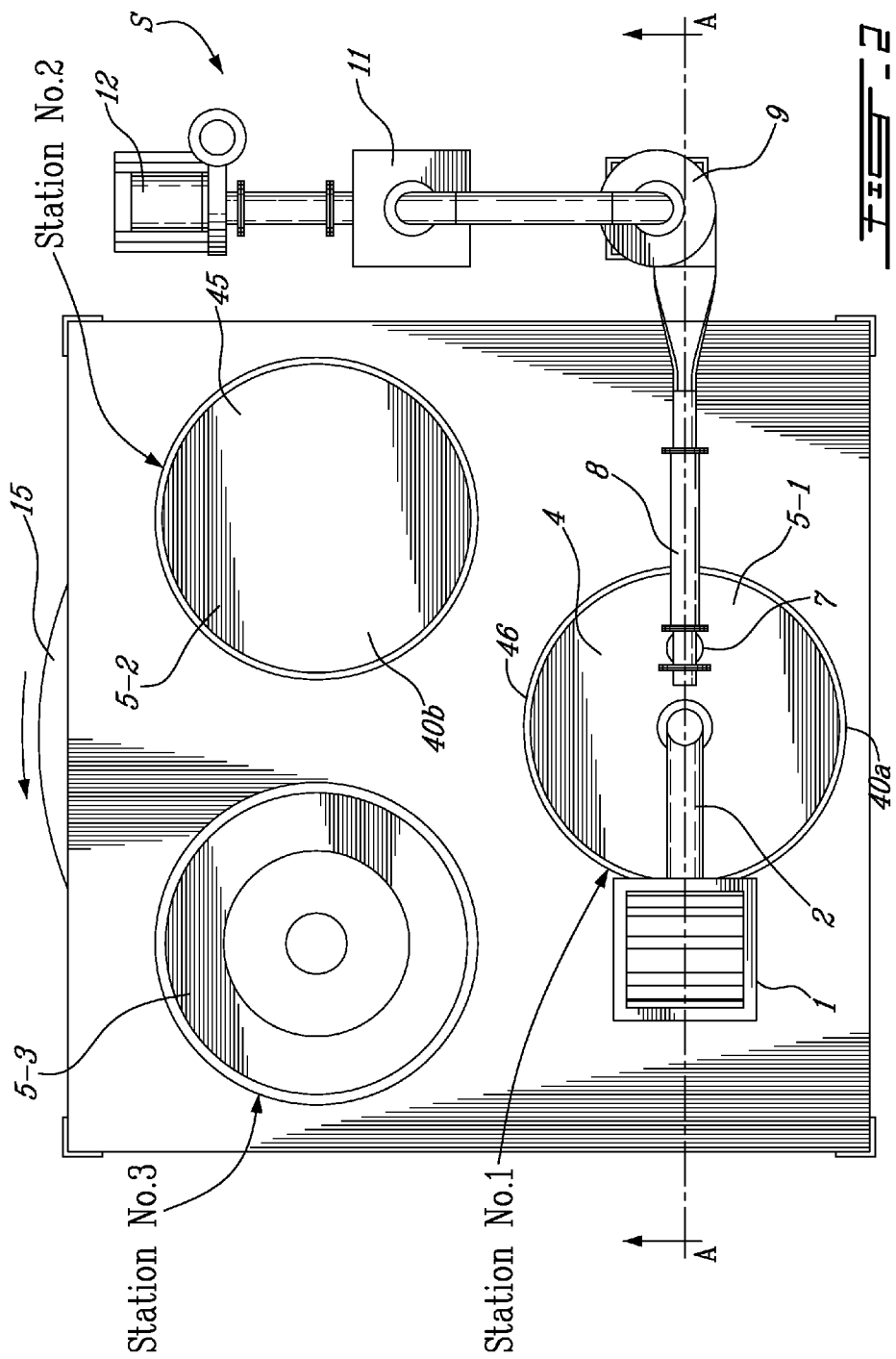
FIG. 2 is a top plan view of the system of FIG. 1.
Figure 3:
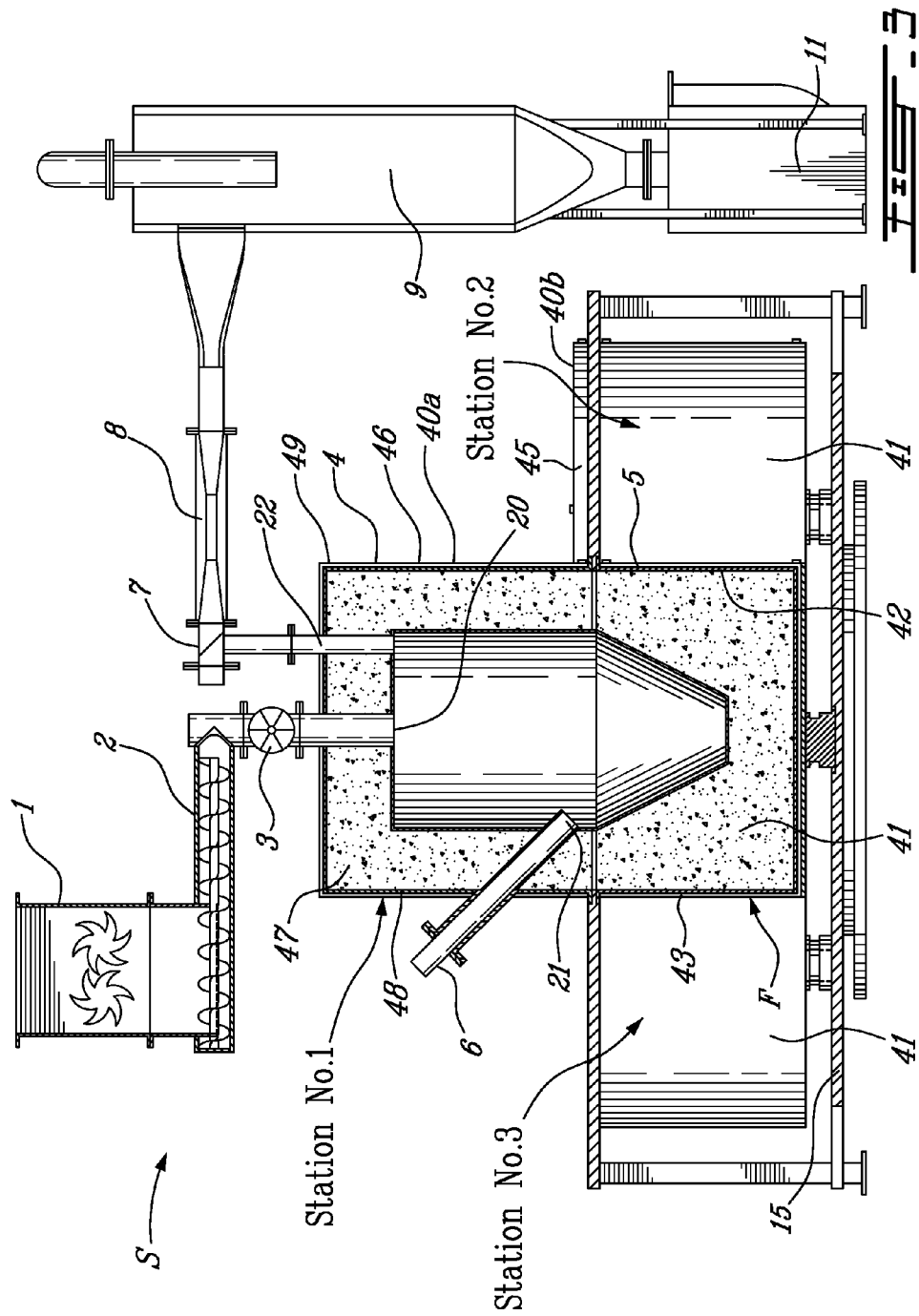
FIG. 3 is a schematic vertical cross-sectional view taken along line A-A of FIG. 2.
Figure 4:
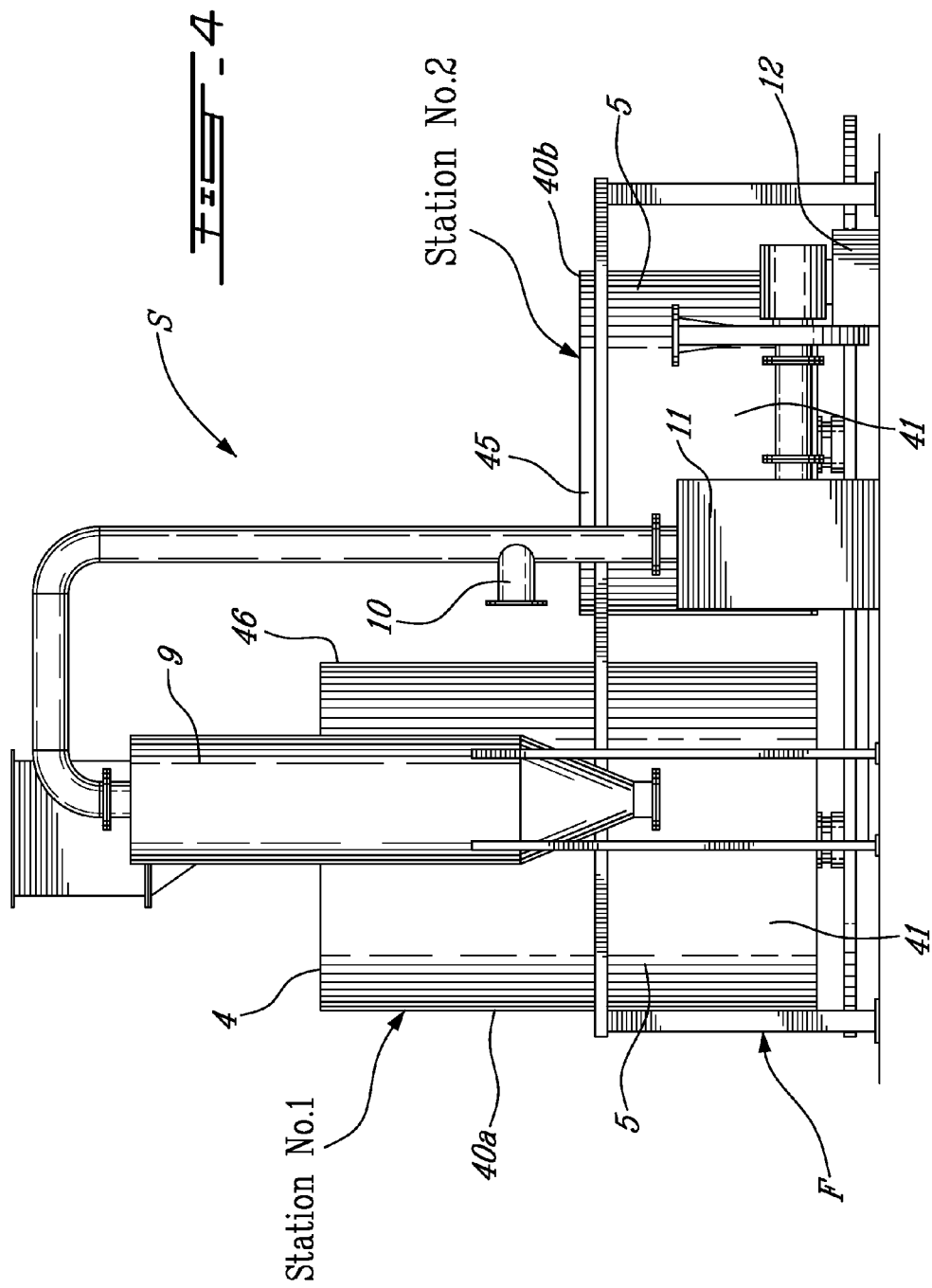
FIG. 4 is a right-side elevations, view of the system of FIG. 1.
Figure 5:
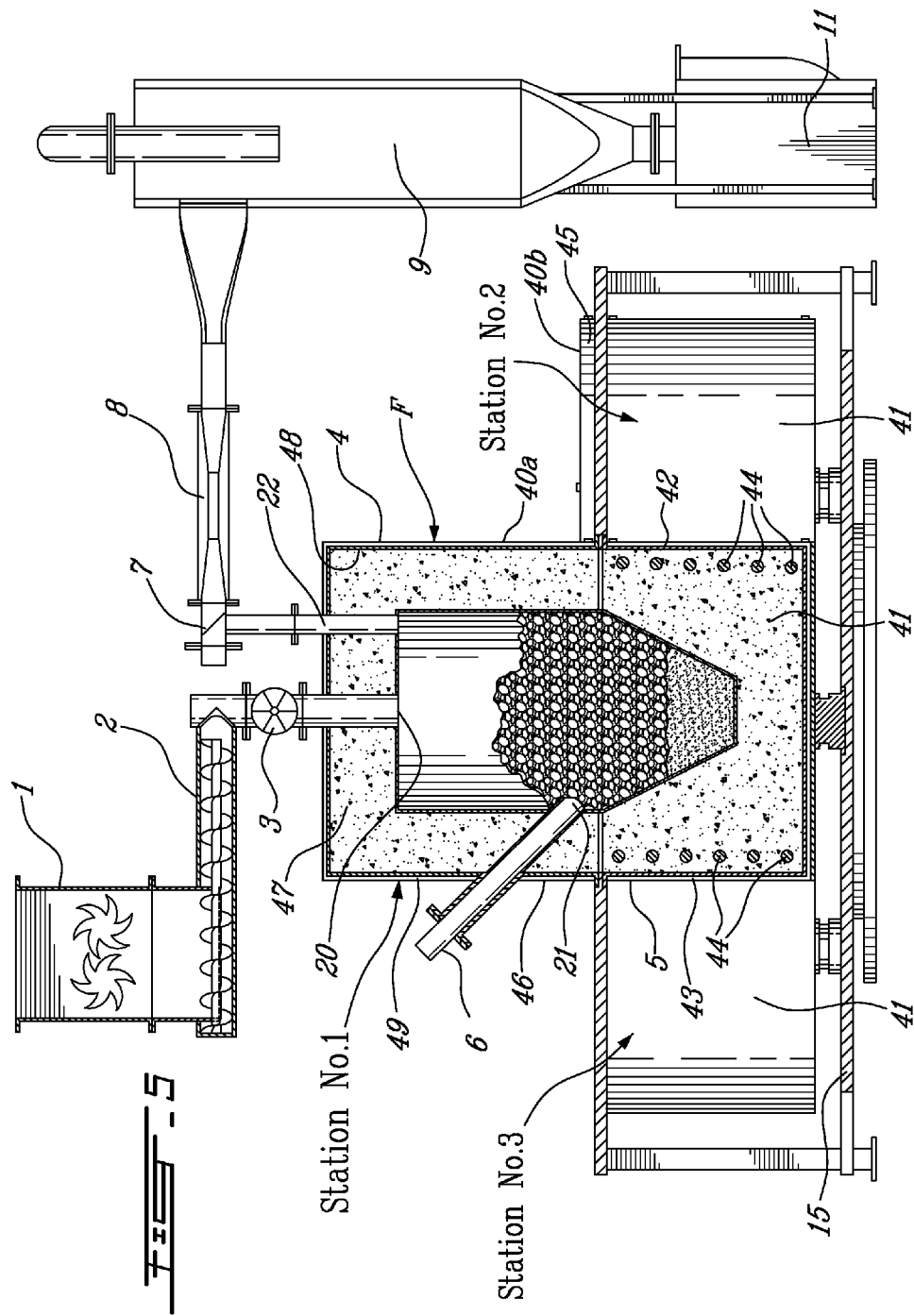
FIG. 5 is a vertical cross-sectional view similar to FIG. 3, while being fragmented to show a treatment chamber in a fragmented and while also showing electric heating elements of a crucible.
Figure 6:
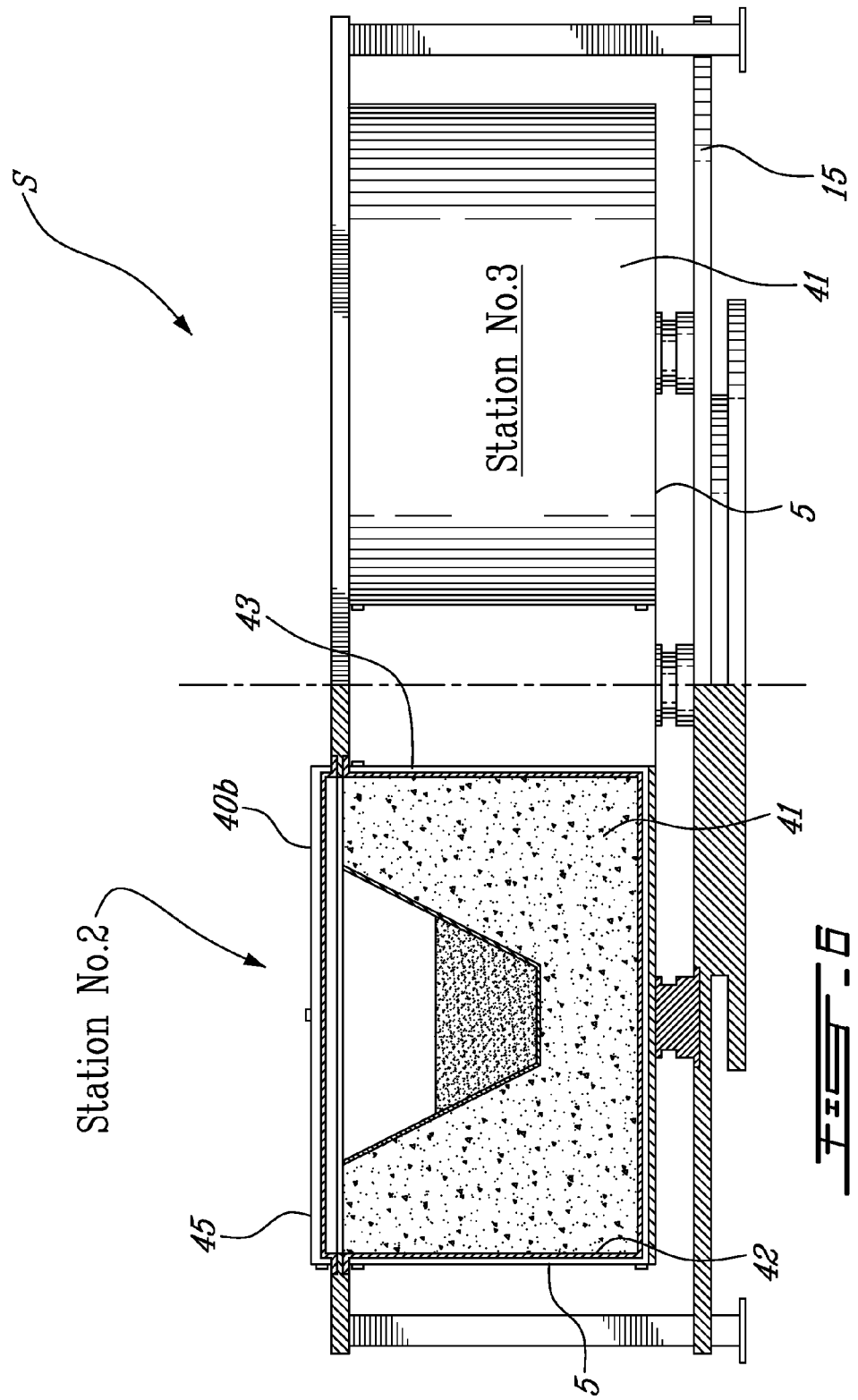
FIG. 6 is an enlarged rear elevational view of part of the system of FIG. 1, which shows in cross-section details of Station No. 2.

The treatment furnace unit F comprises three crucibles (5) mounted on a turntable (15) at three stations, namely Stations No. 1, No. 2 and No. 3, and for identification purposes during the following description of a cycle, the crucibles will be herein referred to as (5-1), (5-2) and (5-3) with their initial positions being shown in FIG. 2. As seen in FIGS. 9 and 9a, the turntable (15) is mounted on wheels that slide on a circular track. The side of the turntable (15) is equipped with a ring gear (30). A motor (31) equipped with a pinion (32) and a gear box (33) is used to rotate the turntable (15) and to change the crucibles positions. The turntable (15) is indexed in order to bring the crucibles (5) to the same fixed position after each movement. The treatment furnace unit F also includes, as shown in the drawings, a first furnace top (40a) and a second furnace top (40b) that cover only two of the crucibles (5), i.e. respectively crucibles (5-1) and (5-2) in FIG. 2, to allow the operations as follows:

The crucible (5-1) in Treatment Station No. 1 is preheated either by the plasma torch (6), seen in FIG. 3, or by the electric heating elements (44), seen in FIG. 5, depending on the Option 1 or 2, respectively.

When the operating temperature has been reached in crucible (5-1) of Treatment Station No. 1, material feeding via conveyor (2) is initiated, for instance at a rate of 50 lbs per hour for 6 hours (assuming that the waste is composed of 25% non organics with a density of 3 lbs/ft3).

After 6 hours of operation feeding is stopped and melting continues for another hour in order to achieve complete melting, or sintering of the waste.

Heating is stopped; then the hot crucible (5-1) is slightly lowered so as to be able to rotate the turntable (15) by 120 degrees (counter-clockwise in FIG. 2) in order to bring the hot crucible (5-1) from Treatment Station No. 1 to Cooling Station No. 2 just below the water cooled top (45). In that position, water-cooling of the crucible is also increased using the piping shown.

Rotation of the turntable (15) also brings the crucible (5-3), previously in Slag Removal Station No. 3, to Treatment Station No. 1 ready for preheating and treatment of waste, e.g. the following day, and also brings the crucible (5-2), previously in Cooling Station No. 2, to Slag Removal Station No. 3.

At the end of the next day, the turntable (15) is again rotated to bring crucible (5-3) In the Cooling Station No. 2 for 24 hours, to bring crucible (5-2) in the Treatment Station No. 1 for the next day, and to bring crucible (5-1) in the Slag Removal Station No. 3.

Figure 7:
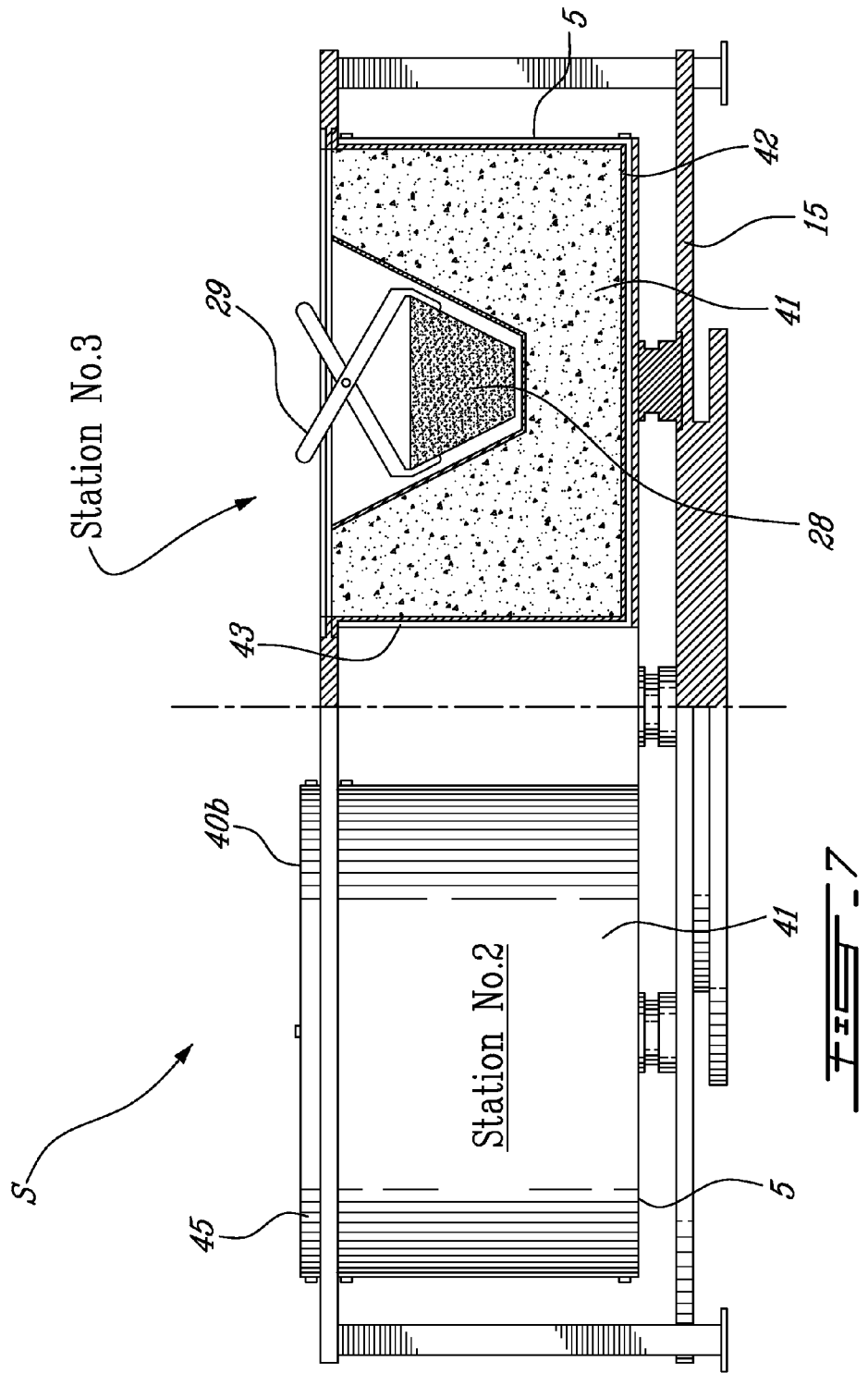
FIG. 7 is an enlarged rear elevational view of part of the system of FIG. 1, which shows in cross-section details of Station No. 3.
Figure 8:
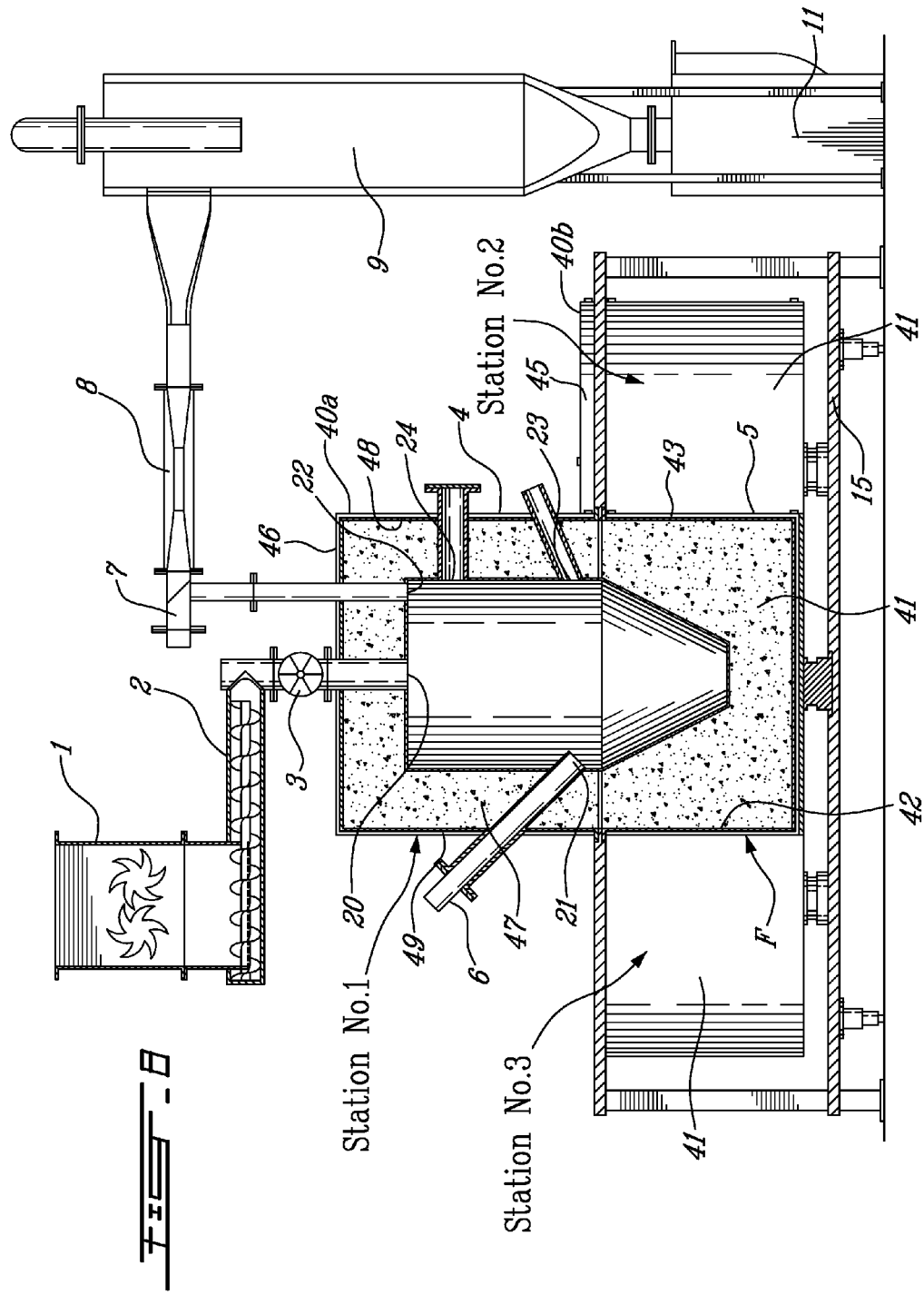
FIG. 8 is a view similar to FIG. 3, but showing two additional ports on a spool of Station No. 1.

Slag or sinter, depending on the option, is removed only at the end of the day, that is after about 40 hours of cooling to provide sufficient cooling. As the inside walls of the crucible are conical and shallow and as the contraction of the previously hot material has occurred, removal of the slag puck (28) with a tool (29) is easy (FIG. 7).

The crucible is covered by a spool (4) used for feeding and treatment of the waste by combustion and combustion air injection. The spool (4) is a refractor-lined vessel having a steel shell (46). The refractory is designed to have a very high level of insulation and therefore maintain the heat inside the vessel. The refractory is further designed with a dense, corrosion resistant material (47) in contact with the process, and one or more low density, low thermal conductivity material (48) at the back, in contact with the shell (46). In order to keep the shell (46) cold, to the touch, an additional layer of insulation (49) can be installed outside the shell (46).

The spool includes several ports, namely a first port (20) for feeding the shredded material, which is located downstream of the rotary valve (3); a second port (21) for inserting the plasma torch (6); a third port (22) for off gas extraction, which communicated with an eductor (8) fired by a second plasma torch (7); a fourth port (23) for air injection, as air is required for proper gasification and combustion of the waste material; and a fifth port (24) for feeding biomedical waste. Biomedical waste is fed as complete, unopened boxes through a double gate valve into the furnace.

The off-gases from the crucible leave through the aforementioned third port (22) at the top of the hood or spool (4) and are fed to the eductor (8) fired by the second plasma torch (7). The eductor (8) can be of the type described in U.S. Pat. No. 6,960,026, which issued on Sep. 28, 1999 to Nolting et al.

The eductor (8) is connected to a cyclonic secondary combustion chamber (9) that has the dual purpose of completing the combustion reactions at high temperature (more than 1000° C.) and of removing entrained particulates from the crucible. Particulates are collected at the bottom of the cyclonic combustion chamber (9).

The gases are then diluted for cooling by air entering via port (10). The gases then go through a filter (11) for fine particulate removal. The whole system is kept under negative pressure using an induced draft fan (12).

The present system S has the following properties:
1. Elements that provide a high level of flexibility:
   a. Waste is accepted without segregation.
   b. A wide variety of waste can be treated by the system: food, cardboard, paper, rags, etc. In particular, waste containing plastics, glass and metal can be treated by the system.
   c. The system also accepts biomedical waste and sharps. The biomedical waste is fed through a separate feed port with minima) operator intervention.
2. Elements that provide a high level of safety:
   a. The system is kept under negative pressure and is completely sealed, enduring no fumes or biohazards leak to the environment.
   b. The residues from the system are safe: all waste is converted to an invert ash or an invert slag. All sharps are converted to an unrecognizable slag.
   c. The furnace Is water cooled and therefore cold to the touch, ensuring operator safety and no heat released to the room, ensuring operator comfort.
   d. Electricity is used as a source of heat. Therefore, no fuel oil is required. No fuel oil lines have to go through the ship. These fuel lines are a safety hazard during ship maintenance and an environmental hazard due to potential leaks. Newer modem ships are moving towards all electric ships.
3. Elements that provide a high level of performance:
   a. Because of the high temperature in the furnace, the result of the waste processing is a clean ash or slag, containing virtually no unburned carbon, making safe to dispose of at sea.
   b. A high temperature secondary combustion chamber, fired by plasma ensures that substantially no products of incomplete combustion are formed.
   c. A gas treatment system including a hot cyclone and a membrane type filter ensures that substantially no dusts escape to the environment and that a low opacity off-gas is produced.
   d. Because electrical energy is used to generate heat, less gas volumes are produced. Hence, the system is compact, occupying only one deck.
   e. The system is fully automated. Minimal operator intervention is required.

Although the present invention has been described hereinabove by way of specific embodiments thereof, it can be modified, without departing from the spirit and nature of the subject invention as defined in the appended claims.

What is claimed is:

1. An apparatus for thermal processing of waste having organic and inorganic components, comprising:
    at least a treatment station, a cooling station and a treated material-removal station,
    at least three crucibles being provided,
    wherein said treatment station is adapted to thermally treat the organic components and/or inorganic components located in a given one of said crucibles located at said treatment station, treated components in said given crucible being adapted to then be cooled at said cooling station, before the treated components located in said given crucible are removed therefrom at said treated material-removal station,
    wherein said crucibles at said treatment and cooling stations are provided with spools,
    and wherein said spool provided in said treatment station has at least four ports, respectively for feeding the organic/inorganic components to the crucible located at said treatment station, for insertion of a plasma torch for heating of said crucible, for injection of air in said crucible, and for extraction of combustion gases.

2. The apparatus as defined in claim 1, wherein said spools are air-tight and refractory-lined.

3. The apparatus as defined in claim 1, wherein said spool provided in said treatment station is a steel shell vessel.

4. The apparatus as defined in claim 1, wherein said spool in said treatment station is provided with a further port for feeding non shredded biomedical waste to the crucible located at said treatment station.

5. The apparatus as defined in claim 1, wherein a refractory of said spool provided in said treatment station is highly insulated, has a corrosion resistant material in contact with the process, and has a low thermal conductivity material at the back, in contact with a shell of said spool.

6. The apparatus as defined in claim 5, wherein an insulating layer is provided on an outside of said shell.

7. The apparatus as defined in claim 1, wherein said three crucibles are part of a furnace unit, a furnace top being provided for covering said crucibles located at said treatment and cooling stations.

8. The apparatus as defined in claim 1, wherein a water-cooled top is provided for said crucible at said cooling station for substantially preventing any gas from escaping to the environment from the cooling of the treated material.

9. The apparatus as defined in claim 1, wherein said crucible at said treatment station is adapted for first stage combustion of the organic components and ashing or melting of the inorganic components into a slag, said crucible at said cooling station being adapted to cool the ashes or the molten slag, and said treated material-removal station is adapted for removal of the ashes or slag from said crucible located thereat.

10. The apparatus as defined in claim 1, wherein the organic/inorganic components provided in the crucible located at said treatment station are heated by at least one plasma torch.

11. The apparatus as defined in claim 10, wherein said plasma torch is adapted to heat said crucible at said treatment station to a temperature of at least 1500° C.

12. The apparatus as defined in claim 1, wherein the organic/inorganic components provided in the crucible located at said treatment station are heated by electric heating elements.

13. The apparatus as defined in claim 12, wherein said electric heating elements are embedded in said crucible and adapted to heat said crucible at said treatment station to a temperature of at least 850° C.

14. The apparatus as defined in claim 1, wherein inside walls of each said crucible are sloped.

15. The apparatus as defined in claim 14, wherein said inside walls are frusto-conical, with a chamber defined thereby having a large end thereof at an upper end of said crucible, thereby facilitating a removal of the treated material in said treated material-removal station.

16. The apparatus as defined in claim 1, wherein each said crucible comprises a refractory-lined vessel.

17. The apparatus as defined in claim 16, wherein said vessel is substantially cylindrical.

18. The apparatus as defined in claim 16, wherein each said crucible is provided with insulation backing for limiting heat losses from a treatment chamber defined in said crucible.

19. The apparatus as defined in claim 16, wherein each said crucible comprises an external water jacket through which water is circulated.

20. The apparatus as defined in claim 19, wherein a shell of said crucible is made of a sea-water corrosion resistant material.

21. The apparatus as defined in claim 20, wherein said sea-water corrosion resistant material is titanium.

22. The apparatus as defined in claim 1, wherein said treatment station comprises a shredder located upstream of a furnace unit.

23. The apparatus as defined in claim 22, wherein said shredder comprises at least one of a shear and a grinder-type device.

24. The apparatus as defined in claim 22, wherein a conveyor is provided between said shredder and said furnace unit.

25. The apparatus as defined in claim 24, wherein a rotary valve is provided to control organic/inorganic components being fed to said furnace unit.

26. The apparatus as defined in claim 1, wherein an eductor is provided in said treatment station for receiving off-gases from said crucible located at said treatment station, said eductor being fired by a plasma torch.

27. The apparatus as defined in claim 26, wherein said eductor is adapted to expose the off-gases to the high temperature of a plasma plume for reheat and to complete the combustion.

28. The apparatus as defined in claim 26, wherein a cyclonic secondary combustion chamber for completing the combustion and separating large dust particulates from the gas stream is connected downstream of said eductor.

29. The apparatus as defined in claim 28, wherein there is provided a negative pressure producing device for drawing off-gases and particulates from said crucible located at said treatment station.

30. The apparatus as defined in claim 28, wherein a gas cooler using air and a filter are provided downstream of said cyclonic secondary combustion chamber.

31. The apparatus as defined in claim 1, wherein said three crucibles are positioned in respective ones of said treatment, cooling and treated material-removal stations, and are adapted to be cyclically displaced from said treatment station to said cooling station to said treated material-removal station, before returning to said treatment station for a new cycle.

32. The apparatus as defined in claim 31, wherein said crucibles are mounted to a crucible displacement device adapted so that said crucibles are synchronously displaced between said stations.

33. The apparatus as defined in claim 31, wherein said crucibles are mounted on a turntable adapted to displace said crucibles from between said stations.

34. The apparatus as defined in claim 33, wherein said turntable is adapted to synchronously displace said crucibles from between said stations, said turntable being indexed so as to bring said crucibles at the same positions within said stations.

35. The apparatus as defined in claim 33, wherein said crucibles are disposed at a 120° angle from one another and substantially at a same radial distance from a rotation center of said turntable, wherein said turntable is rotated 120° at a time.

36. The apparatus as defined in claim 33, wherein said turntable is provided with wheels engaged in a circular track.

37. The apparatus as defined in claim 33, wherein said turntable is provided with a ring gear in meshed engagement with a motor-driven pinion.

* * * * *